Oct. 12, 1926.
M. T. SKINNER
1,602,992
WING SWEEP ATTACHMENT FOR PLOWS
Filed June 29, 1925
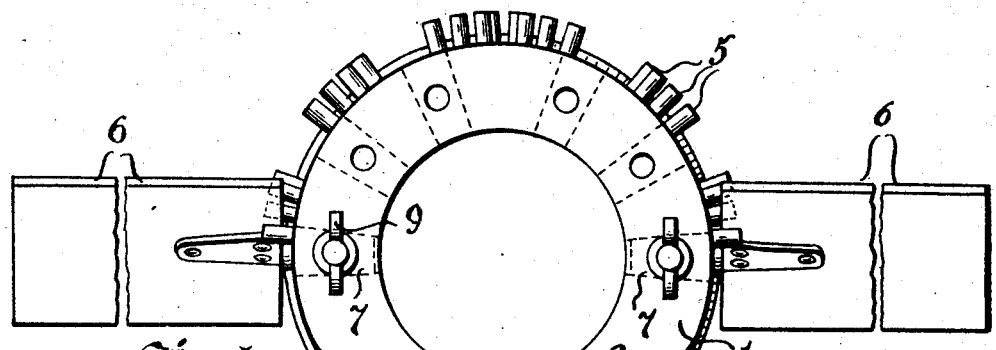
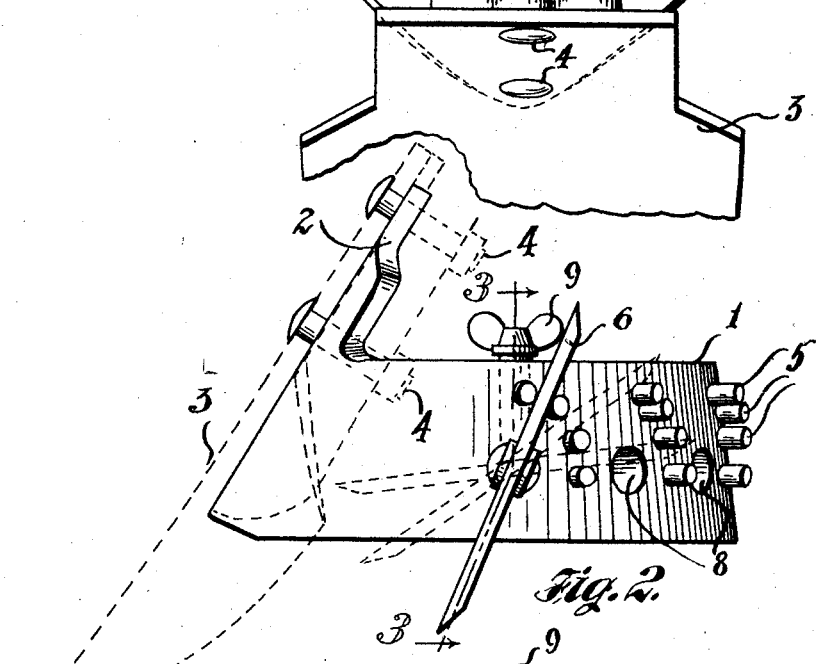
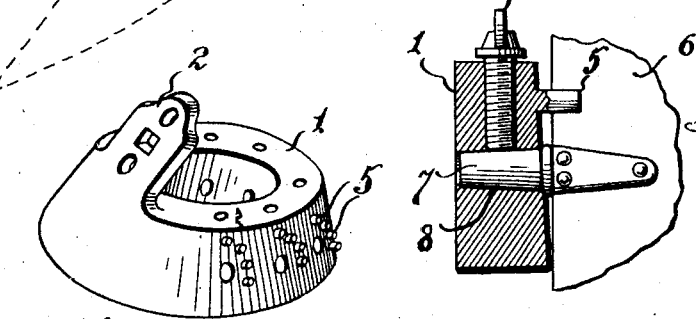
M. T. Skinner,
INVENTOR
BY John M. Spellman
ATTORNEY Patented Oct. 12, 1926.

1,602,992

UNITED STATES PATENT OFFICE.

M. T. SKINNER, OF WACO, TEXAS, ASSIGNOR TO SKINNER HORSE-HOOF COMBINATION SWEEP COMPANY, A CORPORATION OF DELAWARE.

WING-SWEEP ATTACHMENT FOR PLOWS.

Application filed June 29, 1925. Serial No. 40,229.

This invention has relation to an attachment for plows, cultivators or the like and in such connection it relates to that class of attachments covered by Letters Patent #1,230,233 granted to the inventor, the present applicant herein, June 19, 1917, for wing sweep attachment for plows, also Letters Patent covering improvements thereon, dated April 7, 1925, #1,532,556.

The present invention aims to provide a more economical and simpler means for attaching the wing sweeps to the plows, cultivators or the like, whereby the sweeps may be adjusted to desired angles as heretofore with more ease and in less time.

The invention will be better understood by reference to the following description, taken in connection with the accompanying drawings forming part hereof and in which:

Figure 1 is a top or plan view of the invention, the wing sweeps being partly broken away for convenience of illustration.

Figure 2 is a side elevational view of the attachment.

Figure 3 is an enlarged detail sectional view of the inner portion of one of the wing sweeps. illustrating the manner of securing it to the supporting ring, said view taken along the line 3—3 of Figure 2, and Figure 4 is a perspective view of the band or ring to which the sweeps are attached.

Reference being had to the drawings more in detail, 1 denotes a ring or continuous band having its front portion 2 inclined to follow the plane of the plow 3 and projecting well above the rim of the ring as clearly shown in Figure 2. The plow 3 is attached to the front inclined portion 2 by bolts 4—4.

The continuous band or ring 1 is not limited to any particular shape or thickness and as will be seen in Figure 1 has a series of spaced integrally formed pegs or lugs 5—5. These pegs or lugs are preferably formed integrally with the band or ring, but may be separate if preferred. In the present arrangement four of these pegs or lugs comprise a series and are spaced apart in a somewhat curved formation as in Figure 2, three series of pegs or lugs are spaced apart on each side of the band. These pegs are for the purpose of enabling the wing sweep or blades 6—6 to be adjusted and held in position at varying angles as depicted by dotted lines in Figure 2, the blade being inserted between the pegs.

The wing sweep blades 6—6 have each a tapered shank 7 which is receivable in a correspondingly devised recess 8 in the band and this arrangement enables the blade to be adjusted to proper angle and a wing bolt 9 advanced thereon in the hole 8 to hold it in place in the band.

By the above arrangement it will be understood that the device may be attached to any standard type of plow, cultivator or the like. The new arrangement provides a more simple construction with fewer parts and may thus be manufactured at a nominal cost.

It should be understood that the invention is not limited to the manner of arranging the pegs or lugs in the band or of the shape or size of said lugs or pegs, also other parts of the invention may be altered without departing from the meaning of the following claims:

1. In a wing sweep attachment for plows a continuous band having its front portion inclined rearwardly and extended upward and adapted to receive a plow shovel and its body portion provided with a series of spaced pegs formed integrally with said band, wing sweeps removably attached to the band and adjustable to variable angles by positioning portions of the former between said pegs.

2. In a wing sweep attachment for plows, a continuous band, means for attaching a plow shovel thereto, plow sweeps comprising cutting blades, said blades provided with tapered shanks receivable in said band; means for removably locking said shanks in the band; and a series of spaced projections arranged adjacent the shanks in the band, the inner ends of the blades at one side of the shanks being receivable between certain of the projections to effect angular adjustment of the blades.

3. In a wing sweep, a cylindrical body having a series of circumferentially spaced radial openings, a set of spaced pegs on the outer face arranged in an arc adjacent each opening, said body having openings disposed at an angle to the radial openings and communicating therewith, blades having shanks to be fitted into any of the radial openings and adapted to have blades having shanks to be fitted into any of the radial openings and adapted to have portions disposed between certain of the projections, means for holding said shanks in the openings, and an integral upwardly rearwardly inclined portion on said body, said portion providing means for connection between the cylindrical body a plow shovel and the usual supporting foot.

In testimony whereof I have signed my name to this specficaton.
name to this specification.